United States Patent [19]

Uebele et al.

[11] 4,155,901

[45] May 22, 1979

[54] IMPACT-RESISTANT ACRYLONITRILE COPOLYMER PROCESS

[75] Inventors: Curtis E. Uebele, Bedford; Ronald J. Valus, Cleveland, both of Ohio

[73] Assignee: The Standard Oil Company, Cleveland, Ohio

[21] Appl. No.: 555,442

[22] Filed: Mar. 5, 1975

[51] Int. Cl.² ........................................... C08F 279/04
[52] U.S. Cl. ................................................ 260/880 R
[58] Field of Search ................................... 260/880 R

[56] References Cited

U.S. PATENT DOCUMENTS

| | | |
|---|---|---|
| 3,288,887 | 11/1966 | Yoshino ........................ 260/880 R |
| 3,515,774 | 6/1970 | Lee ............................... 260/880 R |
| 3,624,183 | 11/1971 | Leach ............................ 260/880 R |
| 3,627,855 | 12/1971 | Schott ........................... 260/880 R |
| 3,763,278 | 10/1973 | Griffith ......................... 260/880 R |

*Primary Examiner*—Paul R. Michl
*Attorney, Agent, or Firm*—John F. Jones; Sherman J. Kemmer

[57] ABSTRACT

The process for copolymerization of styrene and acrylonitrile in the presence of a diolefin elastomer in high conversion to polymers having superior impact resistance and other excellent physical properties by the careful control of the percent unrealized total solids during the early stages of the copolymerization is described.

5 Claims, No Drawings

IMPACT-RESISTANT ACRYLONITRILE COPOLYMER PROCESS

This invention relates to a novel process for the copolymerization of styrene with acrylonitrile in the presence of a diolefin elastomer, and more particularly pertains to a process for preparing in high conversions such materials which are processable thermoplastics which have superior impact resistance and other excellent physical properties by the controlled copolymerization of styrene and acrylonitrile in the presence of an elastomeric diolefin polymer.

Copolymers of acrylonitrile and styrene and graft copolymers of acrylonitrile and styrene onto diene rubbers have been previously described in "Vinyl and Related Polymers" by C. A. Schildknecht, 1952, pages 49–54, and in U.S. Pat. No. 3,763,278, for instance. The present invention is an improvement in the process described in U.S. Pat. No. 3,763,278.

The polymers resulting from the process of this invention, in which a relatively high mole ratio of acrylonitrile to styrene is maintained in the polymerization reaction, contain greater than equimolar ratios of polymerized acrylonitrile to polymerized styrene in them. The graft copolymers of this invention have markedly superior physical properties and particularly superior and predictable impact resistance.

The diene elastomers used as rubber substrates in the present invention included rubbery homopolymers and copolymers of conjugated dienes having from 4 to 6 carbon atoms such as butadiene, isoprene, chloroprene, piperylene, and the like, and one or more of these dienes can be copolymerized with monomers such as acrylonitrile, methacrylonitrile, styrene, ethyl acrylate, butyl acrylate, and the like. Most preferred conjugated dienes are butadiene and isoprene and most preferred comonomers for the elastomer are acrylonitrile, methacrylonitrile, styrene, and ethyl acrylate. The diene elastomers most useful in this invention preferably should contain 50% or more of polymerized diene.

Copolymers possessing the desired properties were prepared by the process of this invention wherein the monomer mixture used for forming the superstrate in the polymerization is maintained between about 20:1 to 150:1 molar ratio of acrylonitrile to styrene, respectively, so that the final graft copolymeric compositions contain a molar ratio of from about 1.4:1 to 18:1 of polymerized acrylonitrile to styrene in the superstrate portion of the final resin. The final resin was maintained within the foregoing composition ranges by carrying out the copolymerization of the superstrate with continuous addition of acrylonitrile and styrene to the polymerization mixture as the polymerization proceeds.

Copolymerization of acrylonitrile and styrene in the presence of the rubber substrate is preferably carried out in an aqueous medium at a temperature in the range of about 0° C. or below to about 100° C. or above, preferably in the range of from 40° to 70° C., and at atmospheric, subatmospheric or superatmospheric pressures. Preferred because of convenience in handling and recovery of product is an aqueous emulsion or suspension process in which the superstrate monomers are copolymerized in the presence of an emulsion or suspension of the preformed rubber. Preferably, the amount of diene elastomer substrate present in the final resin will vary from about 1% to about 25% by weight of elastomer based on the total weight of the final polymer.

Catalysts which may be used in the copolymerization of the superstrate monomers include the per-acid catalysts such as persulfuric acid, peracetic acid, and perphthalic acid; the per-salt catalysts such as potassium persulfate; the peroxide catalysts such as hydrogen peroxide, benzoyl peroxide, chlorobenzyl peroxide, bromobenzyl peroxide, naphthyl peroxide, acetyl peroxide, benzoyl acetyl peroxide, lauryl peroxide, succinyl peroxide, di-t-butyl peroxide, dicumyl peroxide, cumyl hydroperoxide, t-butyl peracetate, sodium peroxide, barium peroxide, and t-alkyl hydroperoxides such as t-butyl hydroperoxide; azo catalysts such as azobisisobutyronitrile; and, if desired, mixtures of the polymerization initiators may be used. Radiation such as ultraviolet radiation, X-rays, nuclear radiation, etc., may also be used for the initiation of the polymerization.

A particularly preferred method for the polymerization is the polymerization of an aqueous emulsion of superstrate monomers in admixture with an aqueous emulsion of the preformed diene elastomer substrate, and additional styrene and acrylonitrile are continuously added to the polymerization reaction to maintain the desired monomer ratio during the course of the reaction.

We have discovered that high impact resistance can be achieved consistently in the aforementioned superstrate-substrate copolymerization when the percentage of unrealized total solids as measured during about the first two hours of the polymerization does not increase above the level of the percent unrealized total solids of the initial polymerization monomer charge. The unrealized total solids at any time during the polymerization reaction is defined as the theoretical total solids minus the actual total solids divided by the theoretical total solids of the polymerization mixture. The present unrealized total solids of the initial polymerization monomer charge will range between about 10 to 50 and preferably 15 to 45.

Absolute control of the polymerization rate during the early stages of the copolymerization of acrylonitrile and styrene in the presence of a preformed diene elastomer substrate is difficult to achieve. We have found that early polymerization activity in this case can be increased and be made predictable when careful efforts are made to restrict exposure of the polymerization reaction mixture and its components to molecular oxygen or air. Polymerizations carried out under conditions which cause the percentage of unrealized total solids to increase during the first two hours of the polymerization reaction have low impact resistance.

Our process which is further illustrated in the examples includes the use of freshly boiled water, careful nitrogen purging of the acrylonitrile and styrene, and the careful purging of the initial polymerization mixture before the polymerization reaction is started.

Thus, we have discovered that impact resistance in this polymer system relates directly to the polymerization activity during the early stages of the polymerization. This polymerization activity is expressed as percent unrealized total solids (% UTS).

$$\% \ UTS = \frac{\text{Theoretical Total Solids} - \text{Actual Total Solids}}{\text{Theoretical Total Solids}} \times 100$$

We have found that when the % UTS is reduced sharply during the early stages of the polymerization, a high notched Izod impact is achieved for a given resin. Thus, during the early part of a given copolymerization of acrylonitrile and styrene as superstrate in the presence of a diene rubber substrate, decreasing % UTS results in high impact resistance, nearly unchanging % UTS results in a good impact resistance, and increasing % UTS results in poor or no impact resistance.

Emulsifying agents which may be used in the aqueous emulsion polymerization process include the soaps such as sodium and potassium myristate, laurate, palmitate, oleate, stearate, resinate, and hydroabietate; alkali metal alkyl or alkylene sulfonates such as sodium and potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrochloride; and higher molecular weight materials such as sodium polyacrylate, methyl cellulose, polyvinyl pyrrolidone, etc.

Suitable molecular weight modifiers, such as the alkyl and aryl mercaptans, including n-dodecyl mercaptan, t-dodecyl mercaptan, and the like, may be employed to insure molecular weights of resin within the processable range. The modifiers can be used in amounts of from about 0 to about 10% by weight based on the total weight of monomers.

The product of the aqueous emulsion polymerization process is usually a latex. The final resin may be recovered from the latex by any suitable means such as by coagulation with electrolytes or solvents, by freezing, and the like.

Other modifiers, including plasticizers, stabilizers, lubricants, dyes, pigments, and fillers, may be added during the polymerization process provided they do not chemically react with or otherwise adversely affect the ingredients of the reaction mixture. Otherwise, these modifiers may be added following the polymerization. Examples of other modifying agents and pigments which may be added are wood flour, wood fiber, paper dust, clay, glass wool, glass fiber, mica, granite dust, silk flock, cotton flock, steel wool, cloth, sand, carbon black, titanium dioxide, zinc oxide, lead oxide, chrome yellow, gums, oils, waxes, and the like.

Other compounding ingredients, such as extenders, stabilizers, colors, and the like, may be used in preparing the compositions of this invention as is well known in the art so long as the balance between impact strength, flexural strength, tensile strength, processability, heat-distortion temperature, and the like is not affected to such a degree that the composition is no longer useful as a tough, rigid, thermoplastic product.

The resins produced by our process possess many of the ideal properties of thermoplastic resins and, at the same time, possess excellent impact resistance, excellent gas barrier properties, very high heat-distortion temperatures, high tensile strengths, high flexural strengths, good hardness, good resistance to solvents, and a low degree of creep. With such an excellent combination of properties, these resins can be used for many purposes for which the known thermoplastic resins have been used.

The resins resulting from the process of this invention have excellent processing characteristics, and they may be readily extruded, calendered, molded, drawn, embossed, machined, and otherwise treated to form colorless, translucent and, in some cases, transparent, useful, rigid, shock-resistant products and articles which have an excellent balance of good chemical, physical, and electrical properties.

The resins of the process of this invention may be used to good advantage to make all sorts of useful extruded or molded (injection or compression) shapes such as sheets, rods, tubes, and the like, as well as milled or calendered sheets or the like which can be after formed by vacuum drawing or similar operations. These resins are particularly useful in the form of bottles and containers for foods and beverages because of their good gas barrier and impact-resistance properties.

In the following examples which will further illustrate this invention, the amounts of the various materials are expressed in parts by weight unless otherwise specified.

EXAMPLES 1-6

Polymerizations were carried out in a 3000-ml. reactor fitted with a thermometer, a nitrogen-delivery tube, a monomer-delivery dip tube, a water-cooled condenser, and a motor-driven stirrer. The temperature of the polymerization mixture was maintained by means of a constant-temperature water bath. The initial charge components are added to the reactor in the sequence shown below. The monomers were pumped into the reactor under controlled rates by means of a pump, and the monomers were stored and pumped under a nitrogen atmosphere.

| Ingredient | Initial Charge Parts | Addition Sequence |
|---|---|---|
| acrylonitrile | 9.6 | 6 |
| styrene | 0.4 | 5 |
| elastomer latex, 75/25 butadiene/styrene (solids basis) | 15 | 4 |
| total water | 250 | 1 |
| emulsifier (Gafac RE-610*) | 1.25 | 2 |
| citric acid (reagent) | 0.2 | 3 |
| catalyst [2,2'-azobis-(2,4-dimethyl-valeronitrile)] | 0.08 | 8 |
| catalyst (azobisisobutyronitrile) | 0.04 | 7 |
| Continuous Monomer Feed Mixture | | |
| acrylonitrile | 67.5 | |
| styrene | 22.5 | |
| limonene dimercaptan | 0.7 | |

*A mixture of R—O—(CH$_2$CH$_2$O—)$_n$PO$_3$M$_2$ and [R—O—(CH$_2$CH$_2$O—)$_n$]$_2$PO$_2$M wherein n is a number of from 1 to 40, R is an alkyl or alkaryl group and preferably a nonyl phenyl group, and M is hydrogen, ammonia, or an alkali metal, which composition is sold by GAF Corporation.

The emulsifier, citric acid, and elastomer latex were mixed with the water in the sequence given. This mixture was then charged to the reactor and nitrogen purged for 45 minutes with stirred agitation. The temperature was held at 50° C. The initial charge of styrene was added to the flask. The purging was continued an additional 15 minutes. The catalysts were dissolved in the batch amount of acrylonitrile and this mixture was added to the reactor. The continuous monomer feed mixture was then pumped continuously into the reaction at various rates to achieve the percent unrealized total solids values given in the table. This rate was maintained until all of the monomer feed mixture had been added to the polymerization reaction. The water-bath temperature was gradually increased throughout the polymerization reaction period. The initial temperature of 50° C. was increased after the first hour of continuous monomer addition at a rate of 1° C./30 minutes until 56° C. was reached. Thereafter, the rate was increased 2° C./30 minutes. The final latex was vacuum stripped for approximately one hour. The latex was then filtered through cheesecloth and cooled. The latexes were then coagulated at 80° to 90° C. with aqueous alum, the resin was filtered, air dried overnight, and then vacuum dried for about 48 hours at 50° C.

Nine-gram test bars of each resin were made by compression molding the resin in 6 × 0.5-inch molds without pressure up to a temperature of 177° C. and with 6000 to 9000 psi until the temperature reached 218° C. The mold was then cooled under 4000 to 6000 psi.

Standard ASTM test methods were used to determine the physical-strength properties of these resins. Brabender plasticorder tests were carried out on 50-gram samples of resin. The Brabender was run at 230° C. with a speed of 35 rpm.

Table

| Ex. | % Unrealized Total Solids at (X) Hours Feed Time | | | | | Notched Izod | Brabender Torque m.g. | Conversion % |
| --- | --- | --- | --- | --- | --- | --- | --- | --- |
| | 0.0 | 0.5 | 1.0 | 1.5 | 2.0 | | | |
| 1 | 35.4 | 35.0 | 35.0 | 34.0 | 27.0 | 5.91 | 1950 | 83 |
| 2 | 35.4 | 30.5 | 31.7 | 29.4 | 24.4 | 4.05 | 2300 | 80 |
| 3 | 35.4 | 32.7 | 32.8 | 35.2 | 31.7 | 2.66 | 2250 | 81.8 |
| 4 | 35.4 | 34.6 | 34.2 | 34.0 | 35.0 | 2.48 | 1550 | 78 |
| 5 | 35.4 | 35.2 | 33.9 | 33.8 | 30.0 | 2.46 | 1450 | 80 |
| 6 | 35.4 | 41.2 | 46.4 | 42.9 | 36.4 | 0.35 | 1600 | 81.5 |

We claim:

1. In the process comprising copolymerization of a superstrate of 100 parts by weight of acrylonitrile and styrene monomers in the presence of from 1 to 25% by weight of an elastomer substrate containing 50% or more of a polymerized diene wherein the acrylonitrile and styrene monomer molar ratio is maintained between about 20:1 to 150:1, respectively, by the continuous addition of these monomers during the polymerization so that the final polymer contains a molar ratio of from about 1.4:1 to 18:1 of polymerized acrylonitrile to styrene in the superstrate, the improvement comprising controlling the continuous addition of the monomers so that the percentage of unrealized total solids as measured during about the first two hours of the polymerization does not increase above the level of the percentage of unrealized total solids of the initial polymerization monomer charge wherein the unrealized total solids of the initial polymerization monomer charge is 35.4%, the unrealized total solids being defined as the theoretical total solids minus the actual total solids divided by the theoretical total solids of the polymerization mixture at any given time during the polymerization reaction.

2. The process of claim 1 carried out in an aqueous emulsion.

3. The process of claim 2 wherein the elastomer is a copolymer of butadiene and styrene.

4. The process of claim 3 carried out at a temperature in the range of from 40° to 70° C.

5. The process of claim 4 which includes the use of freshly boiled water, careful nitrogen purging of the acrylonitrile and styrene, and the careful purging of the initial polymerization mixture before the polymerization reaction is started.

* * * * *